UNITED STATES PATENT OFFICE.

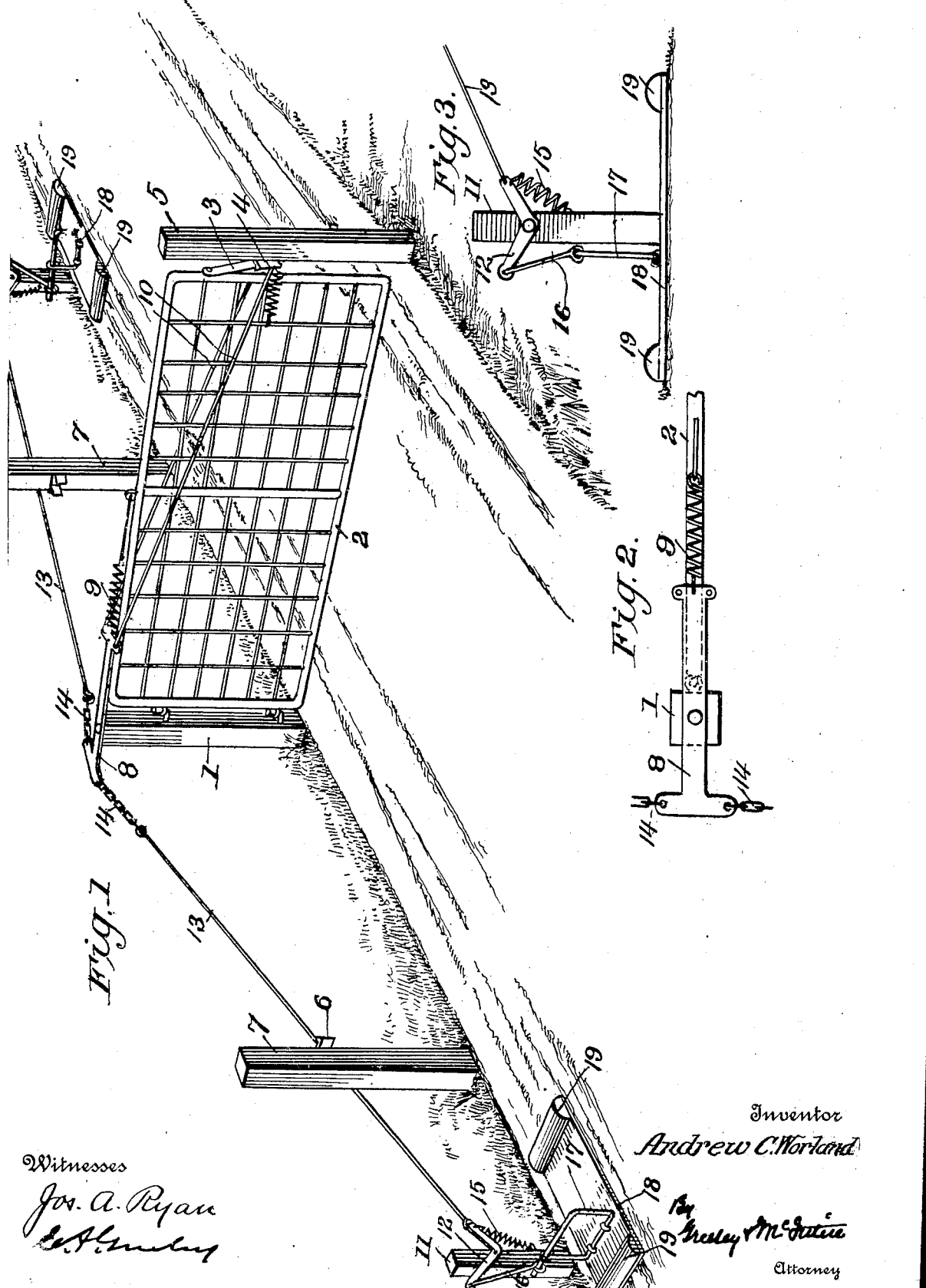

ANDREW C. WORLAND, OF JASPER, INDIANA.

GATE-OPERATING MEANS.

1,177,467.  Specification of Letters Patent.  Patented Mar. 28, 1916.

Application filed July 19, 1910. Serial No. 572,765.

*To all whom it may concern:*

Be it known that I, ANDREW C. WORLAND, a citizen of the United States, residing at Jasper, in the county of Dubois and State of Indiana, have invented certain new and useful Improvements in Gate-Operating Means; and I do hereby declare the following to be a full, clear, and exact description of the invention, such as will enable others skilled in the art to which it appertains to make and use the same.

The present invention relates to certain new and useful improvements in farm gates, and pertains more particularly to a novel mechanism whereby the gate can be opened by an approaching vehicle and closed by a departing vehicle without the necessity of dismounting from the vehicle and manually opening and closing the gate in the usual manner.

The object of the invention is the provision of a gate opening mechanism which is strong and durable in its construction, and which will operate in a reliable and efficient manner to open and close the gate and retain the gate in an open position while the vehicle is passing through the same.

With these and other objects in view, the invention consists in certain combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a perspective view of a farm gate constructed in accordance with the invention, the gate being shown in a closed position. Fig. 2 is a top plan view of the gate post and operating lever, and Fig. 3 is a detail view of one of the swinging frames.

Corresponding and like parts are referred to in the following description and indicated in all the views of the drawing by the same reference characters.

Referring to the drawing, the numeral 1 designates a gate post, and 2 a gate which is hinged thereto so as to swing freely in either direction, the swinging end of the gate being provided with a spring latch 3 adapted to engage a catch 4 upon a latch post 5 when the gate is in a closed position. This latch 3 is also designed to engage a similar catch 6 upon either of the latch posts 7 when the gate has been swung in either direction into an open position.

A main operating lever 8 is pivotally mounted at an intermediate point in its length upon the top of the gate post 1, and one end of this lever is connected by a coil spring 9 to the top of the gate 2. The said end of the main lever 8 is also connected by the wires 10 to the latch 3 so that when the lever is swung in either direction, the wires will withdraw the latch from engagement with the catch 4 and tension will be produced in the coil spring 9 for swinging the gate into an open position.

A short post or standard 11 is located upon each side of the gate and a bell crank lever 12 is pivotally mounted upon each of these standards. One arm of each of the said bell crank levers is connected by a wire 13 and chain 14 to the outer end of the main lever 8, and a coil spring 15 is also connected to the said arm of each of the bell crank levers 12 for holding the same normally in an inoperative position. The opposite arm of each of the bell crank levers 12 is connected by a link or pitman 16 to an arch shaped swinging frame 17 which is normally disposed in a vertical position and has the lower edge thereof pivotally connected to a stationary platform 18. A ridge or elevation 19 is provided at each end of the stationary platform 18 and these ridges serve as stops for engaging the wheel of a vehicle, as will be hereinafter more fully described.

When a vehicle approaches the gate, one of the wheels thereof is designed to pass over the platform 18 and swing the frame 17 down toward the gate. This operates through the link 16 to turn the bell crank lever 12 against the action of the spring 15, and to turn the main lever 8 into a position at substantially right angles to the gate. As previously explained, this movement of the main lever serves to release the latch 3 and to produce tension in the spring 9 for swinging the gate into an open position. The vehicle wheel, after engaging the frame 17 will also engage the far ridge 19 and the vehicle will then be stopped for a short period of time until the gate 2 has attained a sufficient momentum to swing it into an open position and cause the latch 3 to engage the catch 6 upon the far latch post 7. The vehicle will then pass through the gate and will operate through the medium of the swinging frame 17 on the opposite side thereof to again close the gate, the operation of closing the gate being practically identical with that of opening the gate, the swinging frame 17 being moved away from the gate instead of toward the gate, as in the previous instance. For a vehicle coming in the opposite direction, the operation of opening and closing the gate would be just the reverse of that previously described, and it will be noted that in either instance, the gate is opened away from the approaching vehicle.

Having thus described the invention, what I claim as new and desire to secure by Letters Patent, is:—

1. The combination with a gate post, a gate hinged to said post, a lever pivotally mounted on the post, and a gate operating connection between one end of the lever and the gate for opening and closing the same, of a standard upon each side of the gate, a bell crank lever mounted upon each standard, connecting means between one of the arms of the bell crank lever and one end of the gate operating lever, a platform adjacent each standard, a stop ridge at the end of the platform, a swinging frame pivoted upon each platform between the stop ridges and designed to be swung downwardly and to lie between said ridges beneath the plane of their upper edges by the wheel of the vehicle and connecting means between said frame and the opposite arm of the bell crank levers.

2. The combination with a gate and means connected thereto for swinging the same, of posts laterally of the gate platforms positioned near the post, bell cranks pivoted to the post, means connecting one arm of each bell crank with the gate operating means, stop ridges at the opposite ends of each platform, the upper edges of each stop ridge being disposed above the upper surface of its respective platform, a frame comprising a pair of parallel side bars arranged horizontally and a pair of vertical end bars pivoted to the platform intermediate the stop ridges and means connecting the uppermost side bar with its respective bell crank.

In testimony whereof I affix my signature in presence of two witnesses.

ANDREW C. WORLAND.

Witnesses:
ALBERT FRITCH,
FRANK L. BETZ.